(12) United States Patent
Brouwer

(10) Patent No.: US 10,076,999 B2
(45) Date of Patent: Sep. 18, 2018

(54) MOVEMENT MECHANISM AND WING MIRROR FOR A VEHICLE PROVIDED WITH SUCH A MOVEMENT MECHANISM

(71) Applicant: MCi (Mirror Controls International) Netherlands B.V., Woerden (NL)

(72) Inventor: Stefan Frits Brouwer, Woerden (NL)

(73) Assignee: MCi (Mirror Controls International) Netherlands B.V., Woerden (NL)

( * ) Notice: Subject to any disclaimer, the term of this patent is extended or adjusted under 35 U.S.C. 154(b) by 174 days.

(21) Appl. No.: 14/888,660

(22) PCT Filed: May 3, 2013

(86) PCT No.: PCT/NL2013/050337
§ 371 (c)(1),
(2) Date: Nov. 2, 2015

(87) PCT Pub. No.: WO2014/178708
PCT Pub. Date: Nov. 6, 2014

(65) Prior Publication Data
US 2016/0068106 A1    Mar. 10, 2016

(51) Int. Cl.
*B60R 1/062*   (2006.01)
*B60R 1/072*   (2006.01)
(Continued)

(52) U.S. Cl.
CPC .............. *B60R 1/062* (2013.01); *B60R 1/072* (2013.01); *F16H 19/04* (2013.01); *F16H 19/08* (2013.01); *G02B 7/1821* (2013.01)

(58) Field of Classification Search
None
See application file for complete search history.

(56) References Cited

U.S. PATENT DOCUMENTS 4,477,150 A * 10/1984 Usami .................... B60R 1/072
                                                    359/874
6,099,433 A *  8/2000 Brouwer ................ H02K 7/116
                                                    475/153
(Continued)

FOREIGN PATENT DOCUMENTS

CN        1351552 A     5/2002
CN        1273329 C     9/2006
(Continued)

OTHER PUBLICATIONS

Office Action and Search Report from CN 201380077550.7 dated Nov. 18, 2016 with English translation.
(Continued)

*Primary Examiner* — Derek S Chapel
(74) *Attorney, Agent, or Firm* — Swanson & Bratschun, L.L.C.

(57) ABSTRACT

A movement mechanism comprising a substantially spherical holder and a substantially bowl-shaped ring, which are rotatable relative to each other about a first axis and a second axis enclosing an angle of approximately 90° to the first axis. Driving means are provided for enabling movement of the holder relative to the ring and comprise a first non-straight driving rod bearing-mounted in the holder, as well as means for activating the driving rod and a second non-straight driving rod bearing-mounted in the holder, as well as means for activating the driving rod. The first driving rod and the second driving rod are rotatable about a third and a fourth axis, respectively, which third and fourth axes are mutually parallel and lie in a plane equal or parallel to the top face of the holder and which third and fourth axes are parallel to or coincide with the first axis.

15 Claims, 5 Drawing Sheets

(51) Int. Cl.
F16H 19/04 (2006.01)
G02B 7/182 (2006.01)
F16H 19/08 (2006.01)

(56) References Cited

U.S. PATENT DOCUMENTS

| | | | | |
|---|---|---|---|---|
| 6,929,374 B2 | * | 8/2005 | Brouwer | B60R 1/072 |
| | | | | 359/872 |
| 2016/0144789 A1 | * | 5/2016 | Brouwer | B60R 1/072 |
| | | | | 74/422 |

FOREIGN PATENT DOCUMENTS

| | | |
|---|---|---|
| CN | 201325374 Y | 10/2009 |
| DE | 199 19 529 A1 | 8/2000 |
| DE | 103 08 067 A1 | 9/2004 |
| EP | 2 017 127 A1 | 1/2009 |
| WO | WO 98/31565 | 7/1998 |

OTHER PUBLICATIONS

International Search Report from PCT/NL2013/050337 dated Dec. 13, 2013.
Office Action from U.S. Appl. No. 15/012,637 dated Nov. 13, 2017.

* cited by examiner

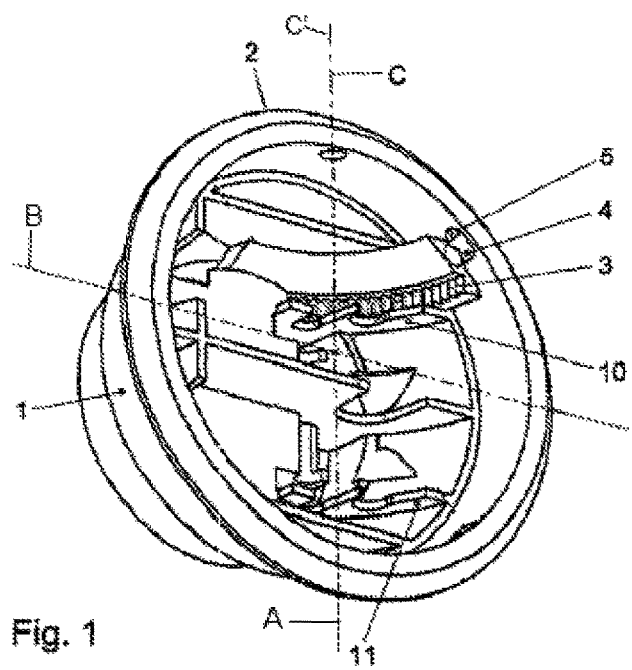
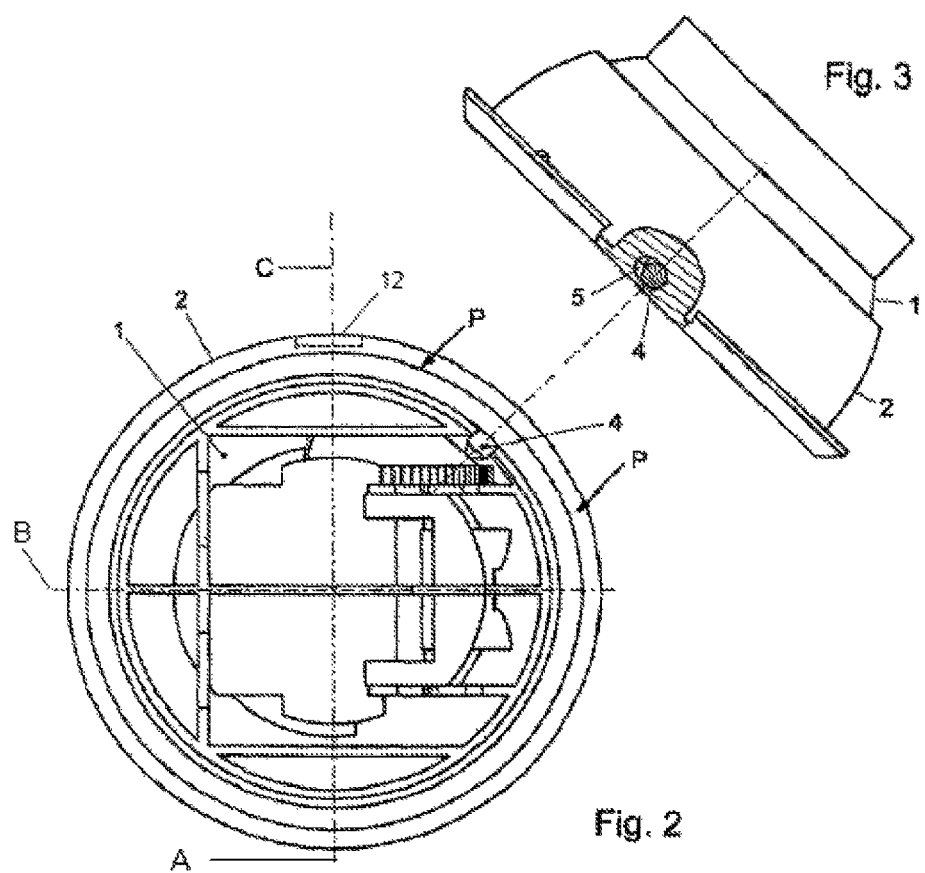

MOVEMENT MECHANISM AND WING MIRROR FOR A VEHICLE PROVIDED WITH SUCH A MOVEMENT MECHANISM

RELATED APPLICATIONS

This application is a 35 U.S.C. § 371 national phase application of PCT/NL2013/050337 (WO 2014/178708), filed on May 3, 2013, entitled "Movement Mechanism and Wing Minor for a Vehicle Provided with Such a Movement Mechanism", which is incorporated herein by reference in its entirety.

The invention relates to a movement mechanism comprising a substantially spherical holder and a substantially bowl-shaped ring, which, when inserted into each other, are rotatable relative to each other about a first axis, which lies in a plane which is substantially parallel with the top face of the holder, and a second axis, which second axis lies in a plane equal or parallel to the top face of the ring, and which second axis lies at an angle of approximately 90° to the first axis, while driving means are provided for enabling movement of the holder relative to the ring, which driving means comprise a first non-straight driving rod bearing-mounted in the holder, as well as means for activating the driving rod and a second non-straight driving rod bearing-mounted in the holder, as well as means for activating the driving rod, wherein the driving rods each have the shape of a ring segment, wherein the first driving rod and the second driving rod are rotatable about a third and a fourth axis, respectively, which third and fourth axes are mutually parallel and lie in a plane equal or parallel to the top face of the holder.

Such a movement mechanism can, for instance, be used for causing an object fixedly connected to the holder to make a movement about one or two axes relative to the fixedly arranged bowl-shaped ring, and can be used for, for instance, wing mirrors of vehicles, in which a mirror plate can be mounted on the bowl-shaped ring, while the holder is mounted in the housing of the mirror plate, which housing can be fixed on a vehicle. Since the driving means for the mirror plate can be fitted in the holder, a rather compact construction of the mirror-adjusting means can be obtained, which, in view of the increasingly stringent requirements imposed on the dimensions of such mirror-adjusting means, is of great importance.

A movement mechanism as described above for a movement about two axes is known from European Patent Application EP-A-1347890. Here, the driving means comprise a driving rod for each of the rotation possibilities about the first and the second axis, respectively. The known driving rods have the shape of a ring segment, which is rotatable about a third axis, which lies in a plane equal or parallel to the top face of the holder, and which lies at an angle of approximately 45° to the first axis which first axis, when the movement mechanism is used as a wing mirror for a vehicle, is substantially parallel to the horizontal plane when the movement mechanism is mounted to a vehicle. The known movement mechanism further comprises means for activating the driving rods which means comprises a motor and associated transmission means for each driving rod so that a single driving rod effects a rotation of the holder relative to the bowl-shaped ring about a respective axis. Although this movement mechanism functions satisfactorily, it appears in some cases, where increased adjustment torques are required to effect a movement of the holder relative to the ring, that the accuracy of the movement mechanism can be reduced leading to additional activations of the driving rod to obtain a correct mutual position. In addition it appears that when the motors are driven by 24V batteries the accuracy of the known movement mechanism in some cases does not meet the highest requirements.

The invention has for its object to prevent these drawbacks and to realize an accurate movement of a spherical holder relative to a bowl-shaped ring even under increased adjustment torques or in 24V applications, while the compact construction of the movement mechanism is maintained and most components can stay alike.

To this end the inventions provides a movement mechanism comprising a substantially spherical holder and a substantially bowl-shaped ring, which, when inserted into each other, are rotatable relative to each other about a first axis, which lies in a plane which is substantially parallel with the top face of the holder, and a second axis, which second axis lies in a plane equal or parallel to the top face of the ring, and which second axis lies at an angle of approximately 90° to the first axis, while driving means are provided for enabling movement of the holder relative to the ring, which driving means comprise a first non-straight driving rod bearing-mounted in the holder, as well as means for activating the driving rod and a second non-straight driving rod bearing-mounted in the holder, as well as means for activating the driving rod, wherein the first driving rod and the second driving rod are rotatable about a third and a fourth axis, respectively, which third and fourth axes are mutually parallel and lie in a plane equal or parallel to the top face of the holder and characterized in that the third and fourth axes are parallel to or coincide with the first axis. In this manner the arrangement of the driving rods is such that both driving rods need to be activated for effecting a rotation of the holder relative to the bowl-shaped ring about a respective axis and consequently increased adjustment torques can be realized. Consequently the rotation axes of the driving rods/ring segments are substantially parallel to the horizontal plane, e.g. the road, when the movement mechanism is used as a wing mirror for a vehicle, which can lead to a simply control for adjusting the mirror.

In a preferred embodiment of a movement mechanism according to the invention, wherein the means for activating the first non-straight driving rod comprises a first motor and associated first transmission means and the means for activating the second non-straight driving rod comprises a second motor and associated second transmission means, the first motor and the second motor are separately drivable and simultaneously drivable for either driving the driving rods in the same direction or in opposite direction. When the driving rods are driven in the same direction the holder and the bowl-shaped ring are rotated relative to each other about the first axis, while when the driving rods are driven in opposite direction the holder and the bowl-shaped ring are rotated relative to each other about the second axis which lies at an angle of approximately 90° to the first axis.

To ensure a predictable load of the motors and thereby improving the accuracy of the adjustment resulting from the relative movement the first motor and the second motor are drivable at the same rotational speed.

In an embodiment of a movement mechanism according to the invention with which the highest requirements regarding accuracy can be met the first and the second transmission means comprise planetary gear drives, which can provide a smooth and regular drive to the driving rods.

In an advantageous embodiment of a movement mechanism according to the invention each of the driving rods is provided with teeth and can carry out a rotational movement, which is defined relative to an axis which substantially coincides with or is parallel to first axis or the second axis depending on the orientation. It is then preferred that the means for activating the driving rods are formed by a driving system provided with a driven toothed wheel.

The invention further relates to a movement mechanism comprising a substantially spherical holder and a substantially bowl-shaped ring surrounding the substantially spherical holder, which, when inserted into each other are rotatable relative to each other about at least one first axis, which lies in a plane which is substantially parallel with the top face of the holder, while driving means are provided for enabling movement of the holder relative to the ring, which driving means comprise a driving rod bearing-mounted in the holder, as well as means for activating the driving rod, wherein the driving rod is provided with teeth and the means for activating the driving rod is formed by a driving system provided with a driven toothed wheel.

Such a movement mechanism can, for instance, be used for causing an object fixedly connected to the holder to make a movement about one or two axes relative to the fixedly arranged bowl-shaped ring, and can be used for, for instance, wing mirrors of vehicles, in which a mirror plate can be mounted on the bowl-shaped ring, while the holder is mounted in the housing of the mirror plate, which housing can be fixed on a vehicle. Since the driving means for the mirror plate can be fitted in the holder, a rather compact construction of the mirror-adjusting means can be obtained, which, in view of the increasingly stringent requirements imposed on the dimensions of such mirror-adjusting means, is of great importance.

A movement mechanism as described above for a movement about two axes is known from European Patent Application EP-A-1347890. Here, the driving means comprise a driving rod for each of the rotation possibilities about the first and the second axis, respectively. The known driving rods have the shape of a ring segment, which is rotatable about a third axis, which lies in a plane equal or parallel to the top face of the holder, and which lies at an angle of approximately 45° to the first axis which first axis, when the movement mechanism is used as a wing mirror for a vehicle, is substantially parallel to the horizontal plane when the movement mechanism is mounted to a vehicle. Each driving rod is provided with teeth and the means for activating the driving rod are further formed by a driving system provided with a driven toothed wheel, the arrangement being such that the driving rod is arranged between the driven toothed wheel and the substantially spherical holder.

Although this movement mechanism functions satisfactorily it appears that in case the movement mechanism is mounted to a vehicle door slamming of the door when closed or opened may result in unwanted alteration of the previously set position of the holder relative to the bowl-shaped ring.

The invention has for its object to prevent this drawback and to realize a movement mechanism which can maintain the relative positioning of the holder and the bowl-shaped ring even in case of mechanical impact, such as e.g. resulting from slamming of a vehicle door to which the movement mechanism is mounted. Due to increasing amount of functions added to the mirror glass (such as heater pads, blinkers etc. which increase the weight of the mirror) the demands on glass stability after door slamming also increase.

To this end the invention provides a movement mechanism comprising a substantially spherical holder and a substantially bowl-shaped ring surrounding the substantially spherical holder, which, when inserted into each other are rotatable relative to each other about at least one first axis, which lies in a plane which is substantially parallel with the top face of the holder, while driving means are provided for enabling movement of the holder relative to the ring, which driving means comprise a driving rod bearing-mounted in the holder, as well as means for activating the driving rod, wherein the driving rod is provided with teeth and the means for activating the driving rod is formed by a driving system provided with a driven toothed wheel, characterized in that the driving rod is a straight driving rod, such as a linear ball rack. The invention is based on the insight that as a result of both the ring segment shape of the known driving rod and the arrangement of the driven toothed wheel between the teeth and the substantially spherical holder the driven toothed wheel can experience such forces during mechanical impact, in particular when the movement mechanism is applied to so-called wing doors, that it moves over the teeth of the non-straight driving rod or that it can even come loose from the driving rod resulting in unwanted alteration of the relative positioning of the holder and the bowl-shaped ring. By, in accordance with the invention, using a straight driving rod, such as a linear ball rack, unwanted alteration of the relative positioning due to impact can be at least reduced. Without being bound by theory, this in particular seems to be the result of the fact that the linear extension of the driving rod and the direction of the impact force enclose the same angle independent on the engagement position of the toothed wheel with regard to the driving rod, which angle in a preferred embodiment can be approximately zero degrees by proper arrangement of the relevant parts. In addition a straight driving rod can be manufactured more robust than a ring shaped one taking into account the available space within the spherical holder. An additional disadvantage of non-straight driving rods is that the angle over which the mirror can be adjusted is relatively limited since the non-straight driving rods at their lower end are relatively close to each other. By in accordance with the invention using straight driving rods the adjustment angle can be enlarged.

In a particularly advantageous embodiment of such a movement mechanism according to the invention the driving rod is arranged between the driven toothed wheel and the substantially spherical holder. In this manner during mechanical impact the driven toothed wheel will be pushed against the driving rod preventing it to come loose from the driving rod so that unwanted alteration of the relative positioning of the holder and the bowl-shaped ring is at least reduced.

Alternatively this object can be achieved in accordance with the invention by providing such a movement mechanism comprising a substantially spherical holder and a substantially bowl-shaped ring surrounding the substantially spherical holder, which, when inserted into each other are rotatable relative to each other about at least one first axis, which lies in a plane which is substantially parallel with the top face of the holder, while driving means are provided for enabling movement of the holder relative to the ring, which driving means comprise a driving rod bearing-mounted in the holder, as well as means for activating the driving rod, wherein the driving rod is provided with teeth and the means for activating the driving rod is formed by a driving system provided with a driven toothed wheel, characterized in that the driving rod is a non-straight driving rod and the driven toothed wheel is arranged between the driving rod and the substantially spherical holder. In this manner during mechanical impact the driven toothed wheel will be pushed against the driving rod preventing it to come loose from the driving rod so that unwanted alteration of the relative positioning of the holder and the bowl-shaped ring is at least reduced even in case a non-straight driving rod is used.

Preferably the driving rod has the shape of a ring segment, which is rotatable about a third axis, which lies in a plane equal or parallel to the top face of the holder and which lies at an angle of approximately 45° to the first axis or which is parallel to or coincides with the first axis.

The invention further relates to a movement mechanism comprising a substantially spherical holder and a substantially bowl-shaped ring, which, when inserted into each other, are rotatable relative to each other about at least one first axis, which lies in a plane which is substantially parallel with the top face of the holder, while driving means are provided for enabling movement of the holder relative to the ring, which driving means comprise a driving rod bearing-mounted in the holder, as well as means for activating the driving rod, wherein the movement mechanism comprises connection means for connecting the driving rod to the ring in a manner allowing relative movement between the driving rod and the ring.

Such a movement mechanism can, for instance, be used for causing an object fixedly connected to the holder to make a movement about one or two axes relative to the fixedly arranged bowl-shaped ring, and can be used for, for instance, wing mirrors of vehicles, in which a mirror plate can be mounted on the bowl-shaped ring, while the holder is mounted in the housing of the mirror plate, which housing can be fixed on a vehicle. Since the driving means for the mirror plate can be fitted in the holder, a rather compact construction of the mirror-adjusting means can be obtained, which, in view of the increasingly stringent requirements imposed on the dimensions of such mirror-adjusting means, is of great importance.

A movement mechanism as described above for a movement about two axes is known from European Patent Application EP-A-1347890. Here, the driving means comprise a driving rod for each of the rotation possibilities about the first and the second axis, respectively. The known driving rods have the shape of a ring segment, which is rotatable about a third axis, which lies in a plane equal or parallel to the top face of the holder, and which lies at an angle of approximately 45° to the first axis which first axis, when the movement mechanism is used as a wing mirror for a vehicle, is substantially parallel to the horizontal plane when the movement mechanism is mounted to a vehicle. The driving rod is furthermore connected with a driving part, which is rotatably mounted in a recess in the ring relative to the second axis. The driving part has the shape of a cylinder which is received in the recess having the shape of a slotted hole. Although this movement mechanism functions satisfactorily it appears in some cases that the driving part can be damaged or even break off leading to improper functioning of the movement mechanism.

The invention has for its object to prevent these drawbacks and to provide a movement mechanism that can function properly over an extended period of time.

To this end the invention provides a movement mechanism comprising a substantially spherical holder and a substantially bowl-shaped ring, which, when inserted into each other, are rotatable relative to each other about at least one first axis, which lies in a plane which is substantially parallel with the top face of the holder, while driving means are provided for enabling movement of the holder relative to the ring, which driving means comprise a driving rod bearing-mounted in the holder, as well as means for activating the driving rod, wherein the movement mechanism comprises connection means for connecting the driving rod to the ring in a manner allowing relative movement between the driving rod and the ring, characterized in that the connection means comprises a driving part connected to the ring and a recess in the driving rod, which driving part is rotatably mounted in the recess, preferably relative to an additional axis, which additional axis lies in a plane equal or parallel to the top face of the ring and which additional axis encloses an angle with the first axis having a value of a multiple of approximately 45°. By connecting the driving part to the ring the connected part can be made more robust leading to a mechanical stronger movement mechanism which can have an extended operational life.

In an embodiment of such a movement mechanism according to the invention the driving part has the shape of a cylinder and the recess can either be circular or have the shape of a slotted hole, while the length of the slotted hole is substantially oriented in a direction enclosing an angle with the first axis having a value of a multiple of approximately 45°.

Preferably the driving part is movably connected with the ring so that, when the driving rod rotates, a relatively small displacement of the driving part becomes possible.

In an advantageous embodiment of such a movement mechanism according to the invention the driving rod has the shape of a ring segment, which is rotatable about a third axis, which lies in a plane equal or parallel to the top face of the holder and which lies either at an angle of approximately 45° to the first axis or which is parallel to or coincides with the first axis. Preferably the driving rod is then provided with teeth and can carry out a rotational movement, which is defined relative to an axis which substantially coincides with the third axis.

In a further embodiment of such a movement mechanism according to the invention the recess is movably arranged in the driving rod in such a manner that, when the driving rod rotates, a relatively small displacement of the recess becomes possible. It is then from a constructional point of view advantageous when the means for activating the driving rod are formed by a driving system provided with a driven toothed wheel.

In order to replace a damaged driving part or for maintenance it is preferred when the driving part is removably connected to the ring.

To this end the invention alternatively provides a movement mechanism comprising a substantially spherical holder and a substantially bowl-shaped ring, which, when inserted into each other, are rotatable relative to each other about at least one first axis, which lies in a plane which is substantially parallel with the top face of the holder, while driving means are provided for enabling movement of the holder relative to the ring, which driving means comprise a driving rod bearing-mounted in the holder, as well as means for activating the driving rod, wherein the movement mechanism comprises connection means for connecting the driving rod to the ring in a manner allowing relative movement between the driving rod and the ring, characterized in that the connection means comprises a driving part which is movably connected to the ring and which preferably is movably connected with the driving rod. By providing the driving part as an intermediate part the driving part can be constructed to comply with the mechanical and physical requirements it needs to meet, while the ring and the driving rod can be constructed to comply with the less severe mechanical and physical requirements they need to meet, which can lead to a relatively cheap movement mechanism.

In an embodiment the connection means, in particular the driving part can be movably connected to the ring and preferably the driving rod by manufacturing the connection means, the ring and preferably the driving rod using a two-component (also called two-step) moulding technique.

A compact construction of such a movement mechanism according to the invention can be obtained when the driving part is rotatably mounted in a recess in the driving rod, preferably relative to an additional second axis, which additional axis lies in a plane equal or parallel to the top face of the ring and which additional axis encloses an angle with the first axis having a value of a multiple of approximately 45°.

In a further embodiment of such a movement mechanism according to the invention the driving rod has the shape of a ring segment, which is rotatable about a third axis, which lies in a plane equal or parallel to the top face of the holder and which either lies at an angle of approximately 45° to the first axis or which is parallel to or coincides with the first axis. This embodiment is particularly important for reasons of space saving.

In a still further embodiment of such a movement mechanism according to the invention the driving part has the shape of a cylinder and the recess can be circular or have the shape of a slotted hole, while the length of the slotted hole is substantially oriented in a direction enclosing an angle with the first axis having a value of a multiple of approximately 45° to the first axis. Preferably the driving rod is then provided with teeth and can carry out a rotational movement, which is defined relative to an axis which substantially coincides with the third axis.

In a further embodiment of such a movement mechanism according to the invention the recess is movably arranged in the driving rod in such a manner that, when the driving rod rotates, a relatively small displacement of the recess becomes possible. It is then from a constructional point of view advantageous when the means for activating the driving rod are formed by a driving system provided with a driven toothed wheel.

In order to replace a damaged driving part or for maintenance it is preferred when the driving part is removably connected to the ring.

The invention further also relates to a wing mirror for a vehicle provided with such a movement mechanism.

Embodiments of the several aspects of the invention will now be explained in more detail with reference to the accompanying drawing.

In these drawings:

FIG. 1 shows a perspective view of a movement mechanism according to the invention;

FIG. 2 shows a top plan view of a movement mechanism in FIG. 1;

FIG. 3 shows a side view of this movement mechanism according to the arrows P;

Figure 9:
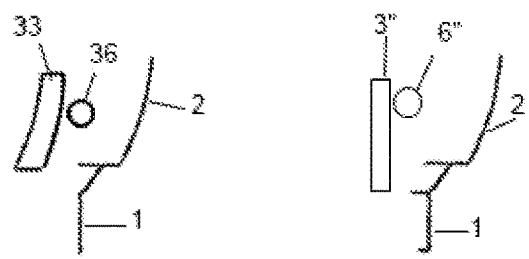
Figure 10:
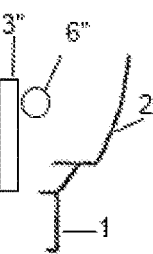
Figure 11:
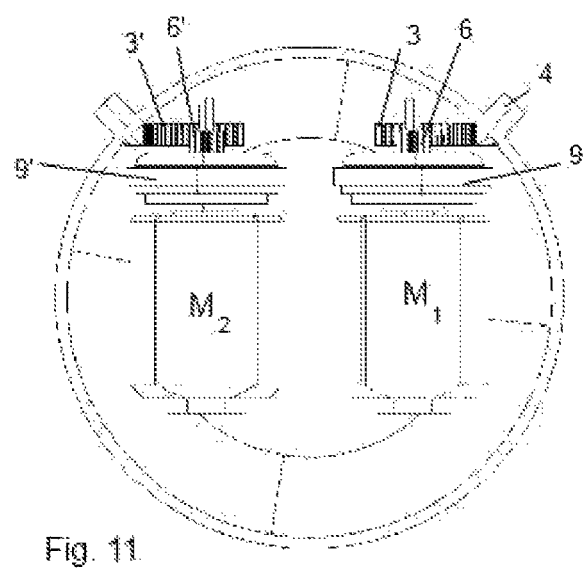
Figure 12:
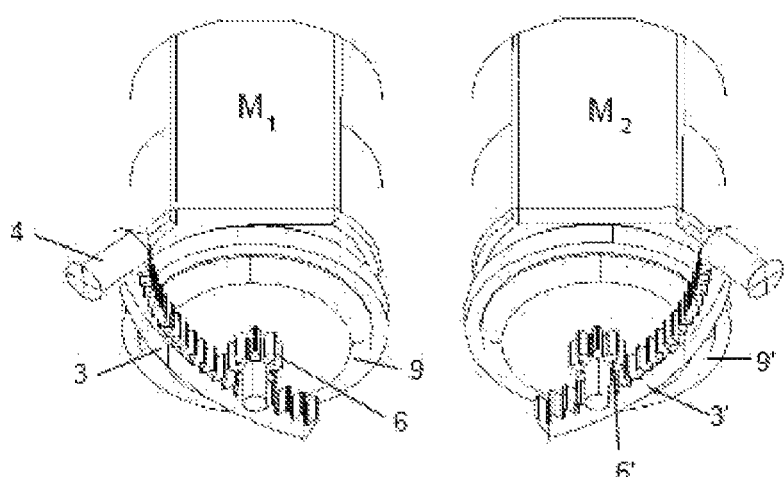

FIG. 9 schematically shows a movement mechanism with a non-straight driving rod and a driven toothed wheel positioned between the driving rod and the spherical holder;

FIG. 10 schematically shows a movement mechanism with a straight driving rod and a driven toothed wheel positioned between the driving rod and the spherical holder;

FIG. 11 schematically shows a top view the embodiment of FIGS. 1-3 in which both motors are shown; and FIG. 12 schematically shows a perspective view seen from the front of the embodiment of FIG. 11.

Corresponding parts in these figures are indicated by identical reference numerals.

The movement mechanism according to FIGS. 1-3 is shown for a movement of a substantially spherical holder 1 relative to a substantially bowl-shaped ring 2 about a first axis A, which lies in a plane which is substantially parallel with the top face of the holder 1. The cardanic suspension of the holder and the ring are not shown any further, because this is not important for the description of the invention. The driving means provided for enabling movement of the holder 1 relative to the ring comprise a non-straight driving rod 3 bearing-mounted in the holder 1 as well as means for activating the driving rod 3. The driving rod 3 has the shape of a ring segment rotatable relative to an axis C. This axis C lies parallel to or coincides with the axis A. The ring segment is provided with teeth meshing with the teeth of a driven toothed wheel 6 of a driving system 9 shown (see FIG. 4).

This driving system 9 comprises a first motor $M_1$, preferably a DC motor and associated transmission means 9 (see FIGS. 11 and 12). By actuating the DC motor the toothed wheel 6 is driven through the transmission means, which has the result that the ring segment is displaced in the holder. Through the connection of the driving rod 3 with a driving part 4 which is rotatably mounted in a recess 5 in the ring 2, a displacement of the driving rod 3 in the holder means that the driving part 4 displaces the ring 2 relative to the holder 1. In the shown embodiment the driving part 4 is designed as a cylindrical element.

In the embodiment of FIGS. 1-3 the driving rod 3 can only move parallel to a plane perpendicular to the axis C. In the shown embodiment the recess 5 has the shape of a slotted hole, but could in an alternative embodiment be circular. The reason for which the driving rod 3 is movable parallel to a plane perpendicular to the axis C resides in the fact that the movement mechanism described herein will be used in practice for a movement of the holder relative to the ring about two axes, namely A and B, and that for a rotation about one of the two axes it is favorable to actuate both motors separately and simultaneously. In case the motors $M_1$, $M_2$ are driven in the same direction the rotation will occur around axis A, while in case the motors are driven in opposite direction the rotation will occur around axis B.

Figure 6:
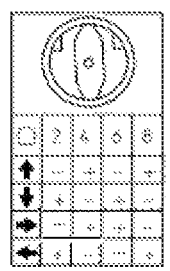
FIG. 6 shows a motion diagram for the connection unit of FIG. 5.
Figure 5:
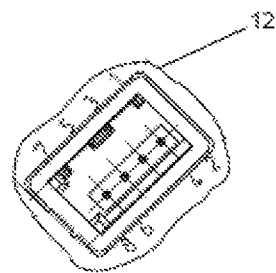
FIG. 5 shows a connection unit of a movement mechanism.

The first motor $M_1$ and the second motor $M_2$ are drivable at the same rotational speed. The separate driving of the first and the second motor can be realized by providing each of the motors with its own ground or earth connection. This means that the movement mechanism comprises a connection unit 12 having four electrical connection leads in stead of the three used in the movement mechanism according to EP-A-1347890. These four electrical connections are shown in FIG. 5 while FIG. 6 indicates a motion diagram depicting the voltage supplied to each connection and the corresponding movement direction of the bowl-shaped ring relative to the holder.

The first and the second transmission means preferably comprise planetary gear drives (9, 9'; 79) which couple the motors to the driving rods.

Here, the driving mechanism 3 is arranged on the side of the partition 10. Diametrically relative to a plane extending parallel to this partition through the center of the movement mechanism a partition 11 is provided parallel to the partition 10. For a two-axis movement of the holder 1 relative to the ring 2 a second driving rod 3' is arranged on the side of this partition, that is to say in the same way as the driving rod 3 is arranged on the side of the partition 10. Of course, the driving means required therefor are arranged in the holder 1 and comprise a second motor $M_2$ and second transmission means 6', 9'. In that case the arrangement of the two driving rods gives an additional space saving compared to the situation in which the two driving rods are perpendicular to each other as is visible in FIGS. 11 and 12.

Figure 4:
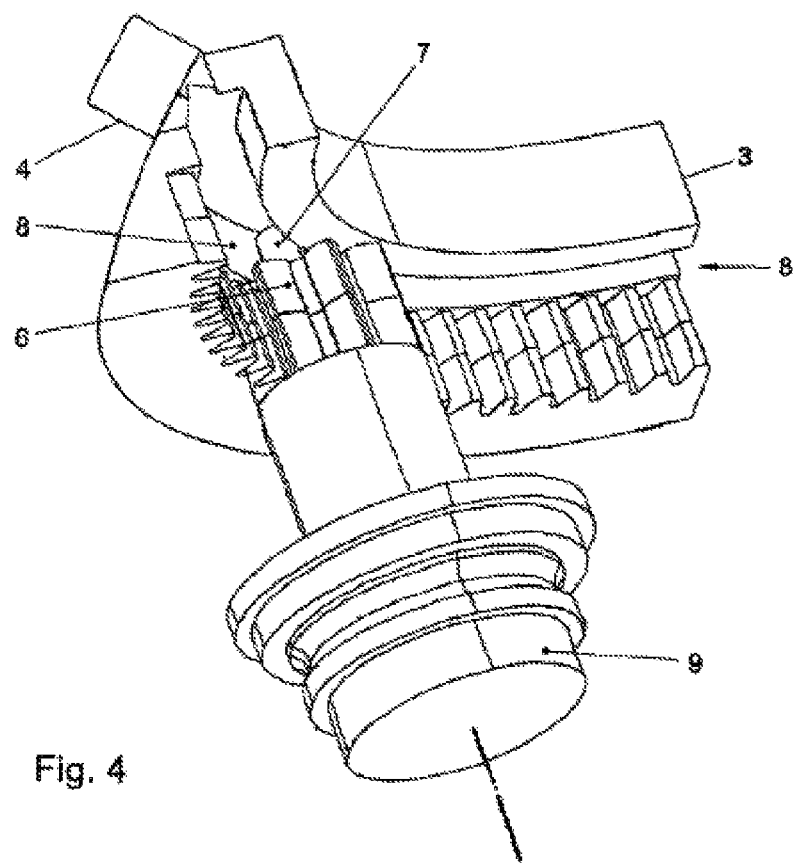
FIG. 4 shows an exemplary embodiment of the driving means for this movement mechanism.

In the embodiment shown in FIG. 4 a laterally directed movement of the driving part 4 occurring during the displacement of the driving rod 3 is prevented by providing the toothed wheel 6 with a shaft part 7 which is radially bearing-mounted in a groove 8 in the driving rod 3. During the displacement of the driving rod 3 a slight axial movement is possible between the shaft part 7 and the groove 8. Please note, that in alternative embodiments such a construction can also be applied to straight driving rods.

The invention is not limited to the exemplary embodiments described herein with reference to the drawing, but comprises all kinds of modifications thereof, of course as far as falling within the scope of protection of the appended claims. Thus, for instance, it is possible to take up the laterally directed movement of the driving part 4 occurring during a displacement of the driving rod 3 by providing the recess 5 in a plate piece which is laterally displaceable relative to the ring 2.

Figure 7:
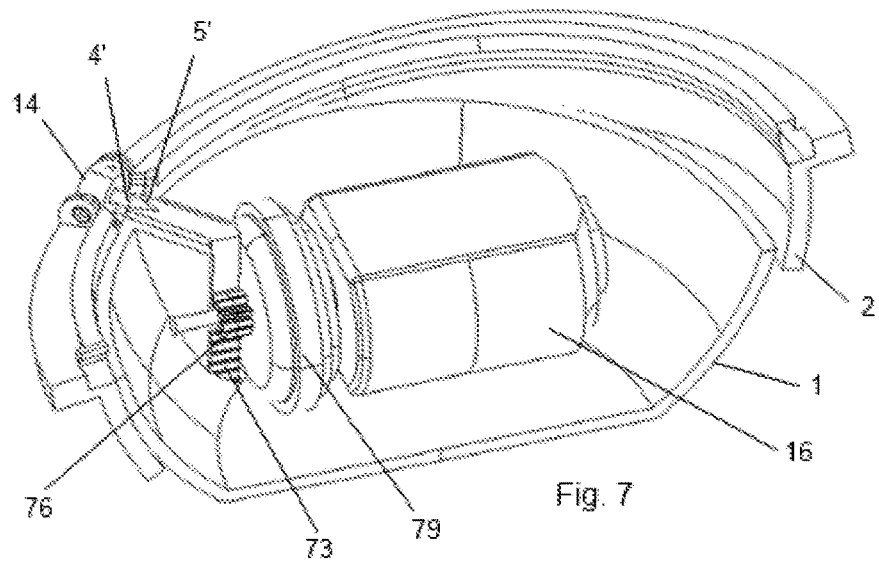
FIG. 7 shows a perspective view of a part of a movement mechanism with a straight driving rod as well as a driving part movably connected to the bowl-shaped ring.
Figure 8:
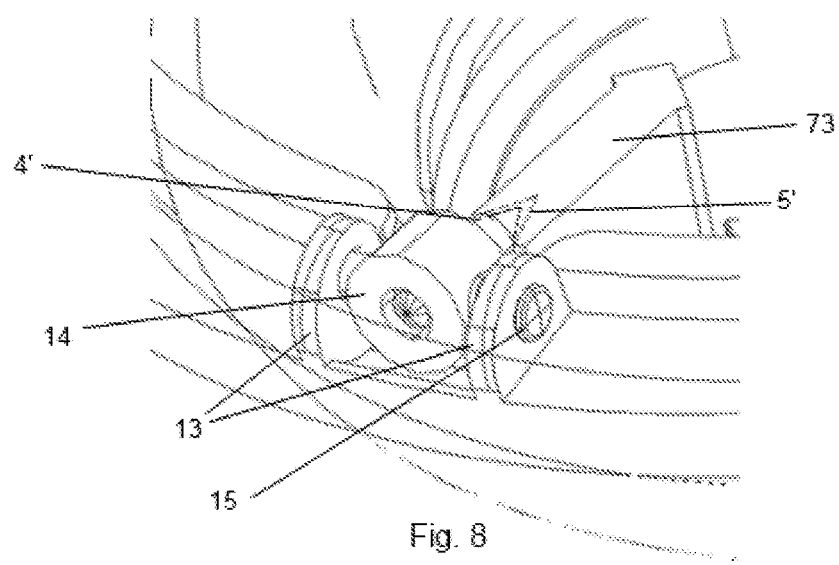
FIG. 8 shows a detailed perspective view of FIG. 7.

In FIGS. 7 and 8 a further movement mechanism according to the invention is shown. As above, the movement mechanism comprises a substantially spherical holder 1 and a substantially bowl-shaped ring 2 surrounding the substantially spherical holder 1. When inserted into each other, as schematically shown in FIG. 7, the substantially spherical holder 1 and the substantially bowl-shaped ring 2 are rotatable relative to each other about at least one first axis, which lies in a plane which is substantially parallel with the top face of the holder 1 and which lies either at an angle of approximately 45° to the first axis (meaning that one driving rod effects rotation around one of the axis) or which is parallel to or coincides with the first axis (meaning that separately and simultaneously driving both motors in the same direction activates both driving rods to effect rotation around the first axis and driving the motors separately and in opposite direction to effect rotation around the second axis which is perpendicular to the first axis). Driving means are provided for enabling movement of the holder 1 relative to the ring 2, which driving means comprise a driving rod 73 bearing-mounted in the holder 1 as well as means 76, 79 for activating the driving rod 73. The driving rod 73 is provided with teeth and the means for activating the driving rod 73 is formed by a driving system 79 provided with a driven toothed wheel 76. The driving system is activated by a motor 16. In contrast to the embodiment described above the driving rod 73 is a straight driving rod, such as a linear ball rack. The functioning and further construction is however analogous.

In addition, FIGS. 7 and 8 depict an embodiment of a still further movement mechanism according to the invention. In this further movement mechanism according to the invention the connection means comprises a driving part 4' which is connected to the ring 2 and a recess 5' provided in the driving rod 73. The driving part 4' is rotatably mounted in the recess 5'. Please note, that although in the embodiment shown the recess 5' is provided in a straight driving rod, in an alternative embodiment the driving rod can be a non-straight driving rod as e.g. shown in FIG. 1, thus e.g. having the shape of a ring segment, which is rotatable about a third axis, which lies in a plane equal or parallel to the top face of the holder 1 and which lies either at an angle of approximately 45° to the first axis or which is parallel to or coincides with the first axis. In addition, in alternative embodiments the engagement of the driving part in the recess can be replaced by a movable connection of the driving part to the driving rod. As shown in FIG. 8 the driving part 4' is connected to a driving part basis 14 which is rotatably mounted between flanges 13 around an axis 15. The functioning and further construction is however analogous.

The recess 5' is shown as being circular, but can in other embodiments have the shape of a slotted hole. The driving part 4' has the shape of a cylinder extending in the recess. In case the recess is a slotted hole, the length of the slotted hole is preferably substantially oriented in a direction parallel to that of the first axis A or in alternative embodiments the length of the slotted hole is substantially oriented in a direction enclosing an angle with the first axis having a value of a multiple of approximately 45° to the first axis.

In an even still further movement mechanism according to the invention or an improved embodiment of the movement mechanism described in the two preceding paragraphs the driving part 4' is movably connected with the ring 2, and preferably movably connected to the driving rod. The functioning and further construction is however analogous.

As indicated in FIG. 8 the driving part 4', 14 can be removably connected to the ring 2 by displacing the flanges 13 apart so that the driving part 4', 14 can be replaced or repaired.

In addition, FIGS. 9 and 10 depict an embodiment of even still further movement mechanisms according to the invention in a schematic way. As shown in both FIGS. 9 and 10 the driven toothed wheel 36; 6" is arranged between the driving rod 33; 3" and the substantially spherical holder 1. This arrangement is applicable to the above described movement mechanisms in which the driving rod is either straight (e.g. a linear ball rack as shown in FIG. 7) or non-straight (a ring segment as shown in e.g. FIG. 12). The functioning and further construction is however analogous.

The invention claimed is:

1. A movement mechanism comprising a substantially spherical holder and a substantially bowl-shaped ring, which, when inserted into each other, are rotatable relative to each other about a first axis, which lies in a plane which is substantially parallel with the top face of the holder, and a second axis, which second axis lies in a plane equal or parallel to the top face of the ring, and which second axis lies at an angle of approximately 90° to the first axis, while driving means are provided for enabling movement of the holder relative to the ring, which driving means comprise a first non-straight driving rod bearing-mounted in the holder, as well as means for activating the first non-straight driving rod, and a second non-straight driving rod bearing-mounted in the holder, as well as means for activating the second non-straight driving rod, wherein the first non-straight driving rod and the second non-straight driving rod are rotatable about a third and a fourth axis, respectively, which third and fourth axes are mutually parallel and lie in a plane equal or parallel to the top face of the holder and wherein the third and fourth axes coincide with the first axis.

2. The movement mechanism according to claim 1, wherein the means for activating the first non-straight driving rod comprises a first motor and associated first transmission means and the means for activating the second non-straight driving rod comprises a second motor and associated second transmission means, wherein the first motor and the second motor are separately drivable and simultaneously drivable for either driving the driving rods in the same direction or in opposite direction.

3. The movement mechanism according to claim 2, further comprising the first motor and the second motor are drivable at the same rotational speed.

4. The movement mechanism according to claim 2, further comprising the first and the second transmission means comprise planetary gear drives.

5. The movement mechanism according to claim 1, further comprising each of the driving rods is provided with teeth and can carry out a rotational movement, which is defined relative to an axis which substantially coincides with the first axis.

6. The movement mechanism according to claim 5, further comprising the means for activating the driving rods are formed by a driving system provided with a driven toothed wheel.

7. The movement mechanism according to claim 1, wherein the movement mechanism is operably coupled to a wing mirror for a vehicle and operable to actuate the wing mirror.

8. The movement mechanism according to claim 1, wherein at least one of the first or second driving rod has the shape of a ring segment.

9. The movement mechanism according to claim 8, wherein the at least one of the first or second driving rod is rotatable about an alternative axis that lies at an angle of approximately 45° to the first axis.

10. A movement mechanism comprising a substantially spherical holder and a substantially bowl-shaped ring surrounding the substantially spherical holder, which, when inserted into each other are rotatable relative to each other about at least one first axis, which lies in a plane which is substantially parallel with the top face of the holder, while driving means are provided for enabling movement of the holder relative to the ring, which driving means comprise a driving rod bearing-mounted in the holder, as well as means for activating the driving rod, wherein the driving rod is provided with teeth arranged on the driving rod on a side facing away from a center of the substantially spherical holder and the means for activating the driving rod is formed by a driving system provided with a driven toothed wheel, wherein the driving rod is a non-straight driving rod and the driven toothed wheel is arranged between the driving rod and the substantially spherical holder away from the center of the substantially spherical holder to engage the teeth of the driving rod.

11. The movement mechanism according to claim 8, wherein the movement mechanism is operably coupled to a wing mirror for a vehicle and operable to actuate the wing mirror.

12. The movement mechanism according to claim 10, further comprising:
a second driving rod which is non-straight bearing-mounted in the holder, as well as means for activating the second non-straight driving rod, wherein the driving rod and the second driving rod are rotatable about a third and a fourth axis, respectively, which third and fourth axes are mutually parallel and lie in a plane equal or parallel to the top face of the holder.

13. The movement mechanism according to claim 12, wherein the driving rod and second driving rods are each configured to carry out a rotational movement, which is defined relative to an axis which substantially coincides with or is parallel to the first axis, wherein the first axis lies in a plane that is substantially parallel with the top face of the holder.

14. The movement mechanism according to claim 10, further comprising the driving rod has the shape of a ring segment, which is rotatable about a third axis, which lies in a plane equal or parallel to the top face of the holder and which lies at an angle of approximately 45° to the first axis.

15. The movement mechanism according to claim 10, further comprising the driving rod has the shape of a ring segment, which is rotatable about a third axis, which lies in a plane equal or parallel to the top face of the holder and which is parallel to or coincides with the first axis.

* * * * *